US012516495B2

(12) United States Patent
Pause

(10) Patent No.: US 12,516,495 B2
(45) Date of Patent: Jan. 6, 2026

(54) OPERATOR ASSIST SYSTEM, WORKING MACHINE AND METHOD FOR ANNIHILATION OR AMPLIFYING OSCILLATION

(71) Applicant: VOLVO CONSTRUCTION EQUIPMENT AB, Eskilstuna (SE)

(72) Inventor: Valentin Pause, Konz (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 175 days.

(21) Appl. No.: 18/220,339

(22) Filed: Jul. 11, 2023

(65) Prior Publication Data

US 2024/0026635 A1 Jan. 25, 2024

(30) Foreign Application Priority Data

Jul. 19, 2022 (EP) ..................................... 22185630

(51) Int. Cl.
*E02F 3/43* (2006.01)
*E02F 3/32* (2006.01)
*E02F 9/26* (2006.01)

(52) U.S. Cl.
CPC ................ *E02F 3/435* (2013.01); *E02F 3/32* (2013.01); *E02F 9/265* (2013.01)

(58) Field of Classification Search
CPC ......... B66C 1/585; B66C 1/68; B66C 13/063; B66C 13/066; E02F 3/32; E02F 3/435; E02F 9/265
See application file for complete search history.

(56) References Cited

U.S. PATENT DOCUMENTS

| 3,895,694 A | 7/1975 | Muntjanoff |
| 4,379,675 A * | 4/1983 | Muntjanoff .......... A01G 23/006 414/734 |
| 8,783,326 B1 * | 7/2014 | Vaninger ............. B60C 25/0551 157/1.24 |

(Continued)

FOREIGN PATENT DOCUMENTS

| DE | 102009025683 A1 | 12/2010 |
| DE | 102018005068 A1 | 1/2020 |

(Continued)

OTHER PUBLICATIONS

Extended European Search Report, EP Application No. 22185630.5, mailed Jan. 20, 2023, 9 pages.

*Primary Examiner* — Tyler J Lee
(74) *Attorney, Agent, or Firm* — Sage Patent Group

(57) ABSTRACT

The disclosed subject matter relates to an operator assist system for a working machine having a boom and an arm and with a freely suspended tool comprising at least one sensor arrangeable at the freely suspended tool or at the arm, which is able to measure angle, velocity and/or acceleration, fast reacting drives for boom and arm and as swing drive, and a control unit, which is able to calculate a needed counter or amplifier movement based on information on angle, velocity and/or acceleration received from the at least one sensor and control the fast reacting drives to carry out the counter or amplifier movement accordingly or to initiate a deceleration or acceleration of the working machine according to the calculated needed counter movement, if the working machine is moving along.

16 Claims, 4 Drawing Sheets

(56) References Cited

U.S. PATENT DOCUMENTS

| | | | | |
|---|---|---|---|---|
| 9,352,940 | B1* | 5/2016 | Cameron | G06K 7/10366 |
| 11,286,644 | B2* | 3/2022 | Maekawa | E02F 9/262 |
| 2005/0242052 | A1* | 11/2005 | O'Connor | B66C 19/007 |
| | | | | 212/344 |
| 2008/0097672 | A1* | 4/2008 | Clark | E02F 3/437 |
| | | | | 701/50 |
| 2020/0011029 | A1* | 1/2020 | Sano | E02F 9/265 |
| 2021/0198868 | A1* | 7/2021 | Maekawa | E02F 9/265 |
| 2021/0289702 | A1* | 9/2021 | Jung | A01D 75/00 |
| 2022/0282460 | A1* | 9/2022 | Oglesby | E02F 3/439 |
| 2023/0349129 | A1* | 11/2023 | Morikawa | E02F 9/24 |
| 2024/0167247 | A1* | 5/2024 | Shimizu | E02F 9/265 |

FOREIGN PATENT DOCUMENTS

| | | | |
|---|---|---|---|
| EP | 1174384 | A1 | 1/2002 |
| EP | 3428110 | B1 | 1/2020 |

* cited by examiner

OPERATOR ASSIST SYSTEM, WORKING MACHINE AND METHOD FOR ANNIHILATION OR AMPLIFYING OSCILLATION

CROSS REFERENCE TO RELATED APPLICATIONS

This application claims priority to European Patent Application No. 22185630.5, filed on Jul. 19, 2022, the disclosure and content of which is incorporated by reference herein in its entirety.

TECHNICAL FIELD

The disclosure relates to an operator assist system for a working machine having a boom and an arm and with a freely suspended tool. Further, the disclosure relates to a working machine having a boom and an arm and with a freely suspended tool with such an operator assist system. Further, the disclosure relates to a method for annihilation or amplifying oscillation of a freely suspended tool of a working machine having a boom and an arm.

The disclosed subject matter is applicable to working machines with a boom and an arm and with a freely suspended tool. In particular, the disclosed subject matter is applicable to working machines within the fields of industrial construction machines or construction equipment. For example, the disclosed subject matter can be used in material handling applications with pendulum-mounted or freely suspended tools like clamshell buckets, wrecking balls, orange peel grapples or timber grapples. The disclosed subject matter is thus applicable for example to excavators, material handlers, timber handlers or log handling machines e.g., based on wheel loader carriages or wheeled excavator carriages. Although the disclosed subject matter will be described with particular respect to a material handler with freely suspended grapple, the disclosed subject matter is not restricted to this particular machine but may also be used in other working machines such as excavators or timber grapples or any working machine with a freely suspended tool in general. In some embodiments, the working machine can be an electric working machine, in particular an electric material handler or alike.

BACKGROUND

The nature of freely suspended tools, such as clamshell buckets, orange peel grapples or timber grapples is that they begin to oscillate when stimulated through motion of the attachment of for example a material handler. Skilled operators can annihilate these oscillations by precisely timed counter movements of parts of the attachment. In recent years skilled operators have become rare and training of new operators is expensive. Even for skilled operators, balancing their tool at least once per load cycle and from time to time also during travelling of the working machine contributes to fatigue. While dampening systems for stationary cranes with only a boom are for example described in DE10 2018 005 068 A1 and EP 3 428 110B1, there are no such systems available for especially freely movable working machines having a boom and an arm.

SUMMARY

An object of the disclosure is to provide an operator assist system, which can annihilate oscillations also for freely movable working machines.

The object is achieved by an operator assist system according to claim 1. Namely, by an operator assist system for a working machine having a boom and an arm and with a freely suspended tool. The operator assist system comprises at least one sensor arrangeable at the freely suspended tool or at the arm, which can measure angle, velocity and/or acceleration. It further comprises fast reacting drives for boom and arm and as a swing drive as well as a control unit. The control can calculate a needed counter or amplifier movement based on information on angle, velocity and/or acceleration received from the at least one sensor and is further able to control the fast-reacting drives to carry out the counter or amplifier movement accordingly or to initiate a deceleration or acceleration of the working machine according to the calculated needed counter movement if the working machine is moving along.

The disclosure is based on the recognition that for working machines with boom and arm having a relatively short pendulum length, resulting in higher oscillation frequencies, the control and actuation being much faster and more responsive than for example in tower crane applications. This is solved via the provision of fast reacting drives, namely for example hydraulic drives like hydraulic cylinders and rotary drives, which allow for higher agility of the counter movement. Furthermore, the operator assist system with the control unit is able to initiate counter movements of swing drive as well as the drives for arm and boom a higher degree of freedom for the counter movement is available, namely there are three degrees of freedom for the correction movement, with arm in/out, boom up/down, and swing left/right, which leads to a more flexible possibility to react on the oscillation. Furthermore, the disclosure includes the recognition that also a deceleration or acceleration of the working machine influence the oscillation of a freely suspended tool and thus can be used for a counter movement. The disclosed subject matter is further useful in applications where the oscillation should be emphasized in order to achieve a better efficiency such as for example during wrecking with a wrecking ball. For these cases, the disclosed subject matter provides the possibility to initiate an amplifier movement of arm, boom or swing drive or a deceleration or acceleration to enhance the efficiency.

According to one embodiment the fast-reacting drives are hydraulic, electric rotary and/or electric linear drives. These drives are especially able to provide a fast reaction to a control command and thus a fast counter or amplifier movement.

According to another embodiment the operator assist system comprises at least four sensors, wherein a first sensor is arranged at the freely suspended tool, a second sensor is arranged at the arm, a third sensor is arranged at the boom and a fourth sensor is arranged at a machine body and wherein the sensors can measure angle, velocity and/or acceleration. With sensors on boom, arm, freely suspended tool and machine body an oscillation of the freely suspended tool as well as movements of the other parts of the working machine are detectable with enhanced precision and thus also the precision of the counter or amplifier movement is enhanced.

According to another embodiment at least one sensor is an Inertial Measurement Unit (IMU), a stroke sensor or a Hall-Effect Angle sensor. According to another embodiment the velocity is an angular velocity and/or the acceleration is an angular acceleration. This leads to further improved counter or amplifier movements.

In some embodiments, the counter or amplifier movement comprises at least one of the following movement directions: moving the arm in or out, moving the boom up or down and swing left or right. Especially combinations of those directions allow for a further improved annihilation or amplified oscillation. Especially for pendulum mounted tools or applications with a typically very high oscillation angle and therefore high vertical component in the oscillation, an additional counter movement of the boom to annihilate the vertical component of the oscillation can improve the efficacy of the operator assist system. According to another embodiment the operator assist system further comprise a vehicle speed sensor and the control unit can overlay an acceleration or deceleration demand of the operator or in autonomous applications of a travel control unit to stabilize the tool during acceleration or deceleration. Thus, oscillation annihilation is also possible via the travel drive through controlled acceleration or deceleration of the machine for example for log handling machines based on wheel loader carriages or wheeled excavator carriages.

According to a further embodiment the control unit is further able to detect an oscillation of the freely suspended tool based on the information received from the sensors and to initiate calculation of the counter or amplifier movement and/or to initiate a notification on the oscillation to the driver. With this embodiment it is not only possible to counteract or amplify an oscillation but also to start such a process automatically or at least inform the operator.

According to a further embodiment the control unit can continuously calculate the counter or amplifier movement. With this embodiment a continuous and/or very fast reaction to a detected oscillation is further enhanced.

According to a further embodiment the operator assist system further comprises a user interface, which is designed to initiate calculation of the counter or amplifier movement on actuation by the operator and/or to disable any counter or amplifier movement on actuation by the operator, wherein the user interface is at least one button and arranged in a joystick of the working machine. In not fully automated assist systems, the operator is thus able to initiate an automated counter or amplifier movement.

According to a further embodiment the control unit is further able to isolate an oscillating motion of the freely suspended tool from its translatory movement due to a movement of the working machine using signal filtering and/or to isolate an oscillating motion of the freely suspended tool from its rotatory movement due to a movement of the working machine using signal filtering. This allows for an improved reaction to the oscillating motion.

According to a further embodiment initiating a deceleration comprises either to initiate a notification on the need of deceleration to the driver or to send a signal for deceleration to a machine control unit. Thus, either a fully automated system or a system with operator input is possible.

According to a further aspect of the disclosed subject matter, the object is achieved by a working machine according to claim 12. The working machine has a boom, an arm, a freely suspended tool and an operator assist system described above. As to the advantages, in some embodiments and details of the working machine, reference is made to the corresponding aspects and embodiments described herein above as well as of the further aspect and their embodiments described herein below.

According to a further aspect of the disclosed subject matter, the object is achieved by a method according to claim 13 for annihilation or amplifying oscillation of a freely suspended tool of a working machine having a boom and/or an arm and a fast-reacting swing drive. In particular, the method comprises the following steps:

measure the angle, velocity and/or acceleration using at least one sensor at the arm or on the freely suspended tool, e.g., several sensors on a machine body, on the boom, at the arm and on the freely suspended tool;
calculate a needed counter or amplifier movement based on measured angle, velocity and/or acceleration; and
carry out the counter or amplifier movement using fast reacting drives for boom and/or arm and/or the swing drive accordingly or initiate a deceleration of the working machine according to the calculated needed counter movement if the working machine is moving along.

As to the advantages, in some embodiments and details of the method, reference is made to the corresponding aspects and embodiments described herein above as well as of the further aspects and their embodiments described herein.

According to a further embodiment, the method further comprises the step of isolating an oscillating motion of the freely suspended tool from its translatory movement due to a movement of the working machine using signal filtering. According to a further embodiment, the method further comprises the step of isolating an oscillating motion of the freely suspended tool from its rotatory movement due to a movement of the working machine using signal filtering. These embodiments may allow for an improved reaction to the oscillating motion.

Further advantages and advantageous features of the disclosed subject matter are presented in the following description and in the dependent claims.

BRIEF DESCRIPTION OF THE DRAWINGS

With reference to the appended drawings, below follows a more detailed description of embodiments of the disclosed subject matter cited as examples.

In the drawings.

DETAILED DESCRIPTION

Figure 1:
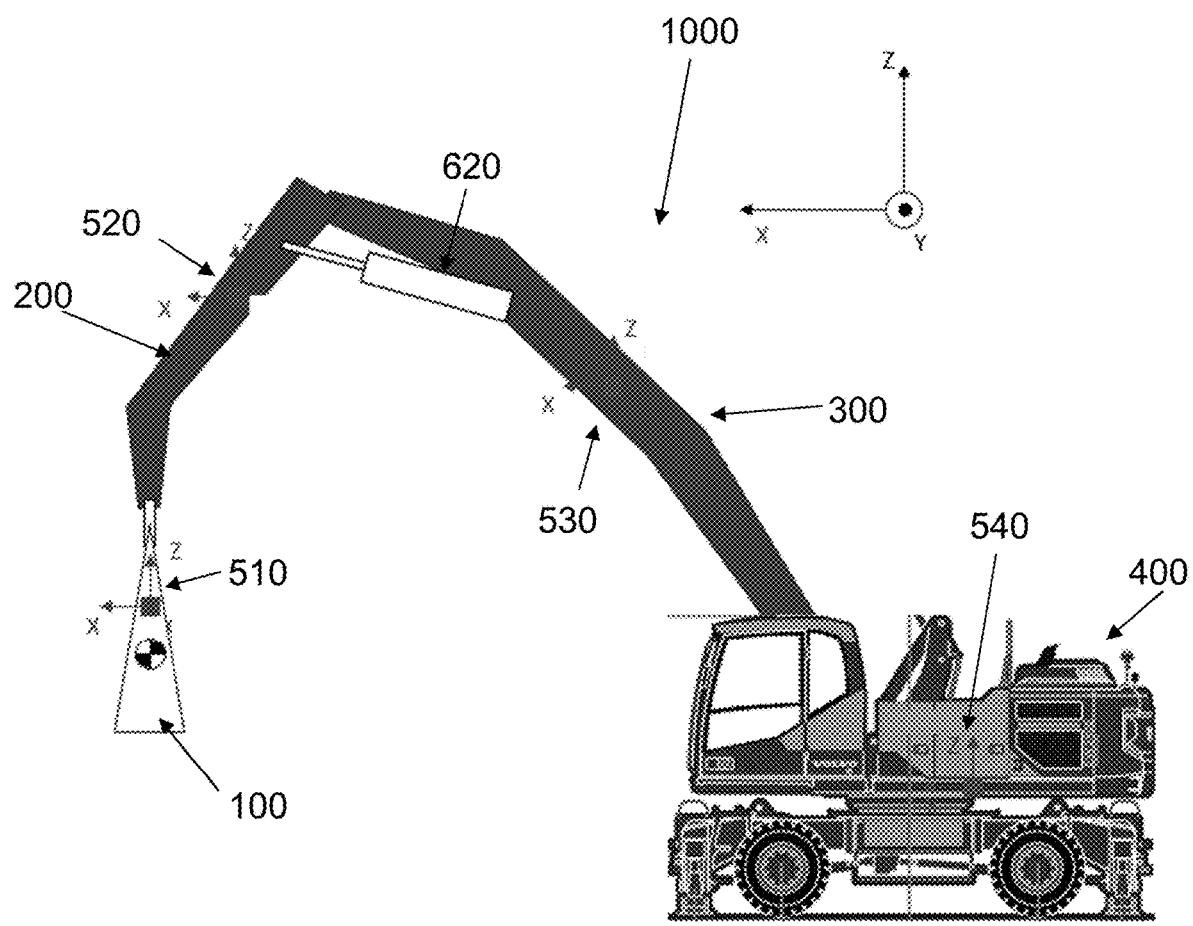
FIG. 1 is a schematic view of a material handler with an operator assist system according to an embodiment.

It is to be understood that the present disclosure is not limited to the embodiments described above and illustrated in the drawings; rather, the skilled person will recognize that many changes and modifications may be made within the scope of the appended claims.

Like reference character refer to like elements throughout the description.

FIG. 1 is a schematic view of a material handler 1000 with an operator assist system according to some embodiments. Material handler 1000 as an example for a working machine having a boom 300 and an arm 200 and a freely suspended tool has in the shown embodiment a grapple 100 as the freely suspended tool. The operator assist system comprises in the shown embodiment four sensors. A first sensor 510 is arranged at the freely suspended tool 100, a second sensor 520 is arranged at the arm 200, a third sensor 530 is arranged at the boom 300 and a fourth sensor 540 is arranged at a machine body 400. All these sensors can measure angle, velocity, and acceleration. In some embodiments, the velocity is an angular velocity and/or the acceleration is an angular acceleration. Herein, all sensors are Inertial Measurement Units (IMUs).

The operator assist system further comprises a fast-reacting drive (not shown here) for boom 300 as well as a fast-reacting drive 620 for arm 200 and swing drive (not shown here) and a control unit (not shown here). The control unit can calculate a needed counter or amplifier movement based on information on angle, velocity and acceleration received from the sensors 510, 520, 530 and 540 and to control the fast-reacting drives to carry out a counter movement accordingly. Furthermore, the control unit can initiate a deceleration of the working machine according to the calculated needed counter movement if the working machine is moving along.

The fast-reacting drives are hydraulic drives in the shown embodiment. The counter movement comprises at least one of the following movement directions: moving the arm in or out, moving the boom up or down and swing left or right.

For example, a counter movement in x-direction can be calculated for small oscillation angles of the freely suspended tool using measured angle, angular velocity, and acceleration in y-direction as well as a length of the arm 200 and a distance of the center of gravity of the grapple from a suspension of the grapple. A counter movement in y-direction can be calculated using measured angle, angular velocity, and acceleration in y-direction as well as a swing drive displacement, a swing gear ratio, and a distance of the center of gravity of the grapple from a swing axle of the working machine.

Especially for freely suspended tools or applications with a typically very high oscillation angle and therefore high z-component in the oscillation, an additional counter movement of the boom to annihilate the z-component of the oscillation can improve the efficacy of the oscillation annihilation.

Figure 2:
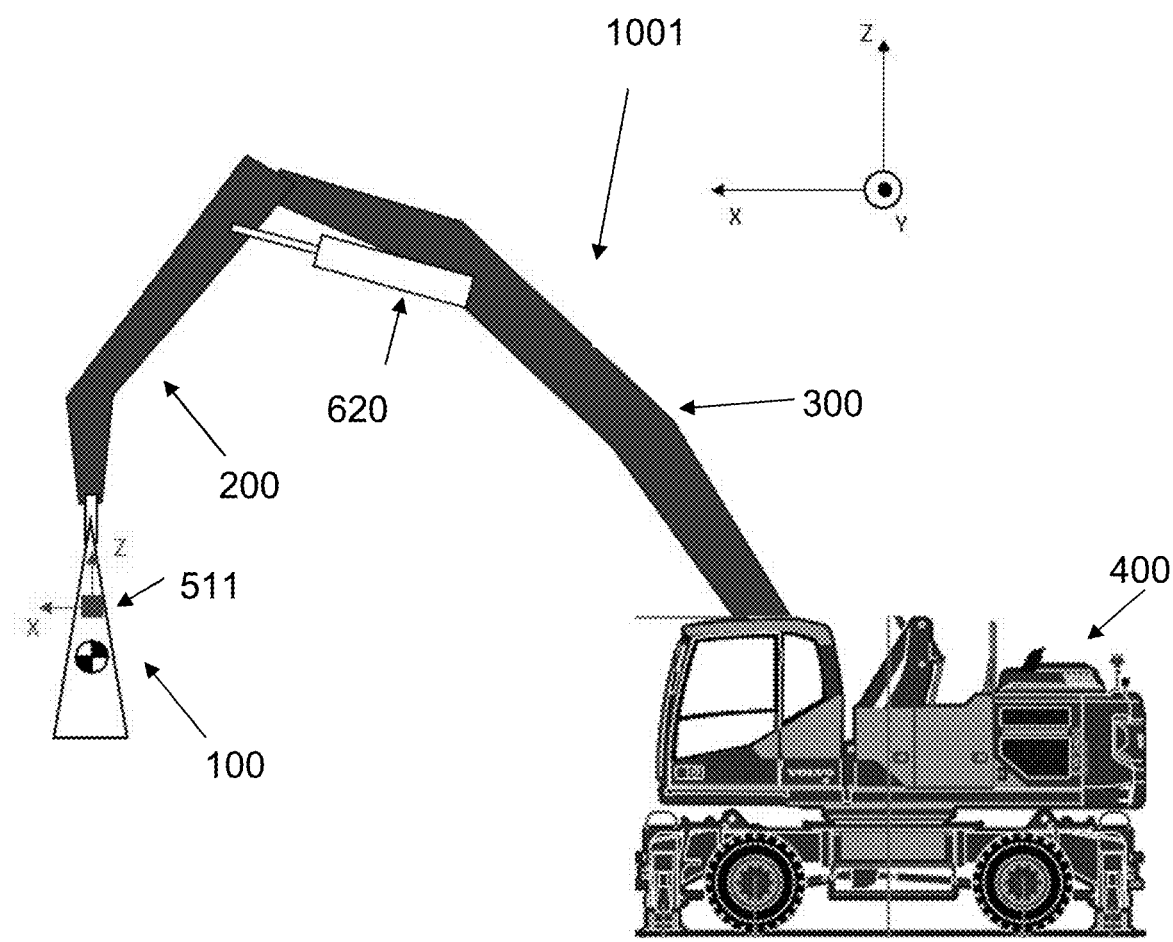
FIG. 2 is a schematic view of a material handler with an operator assist system according to a further embodiment.

FIG. 2 is a schematic view of a material handler with an operator assist system according to at least one embodiment. The material handler 1001 resembles the material handler in 1000 of FIG. 1, thus merely the differences between both are described in the following. For some applications also the use of only one sensor 511 at the freely suspended tool 100 is sufficient. With this embodiment a counter movement and thus oscillation annihilation can be tuned for a specific attachment position and body roll and pitch angle. A potential use case therefore is that the working machine has a fixed position relative to a dumping spot, e.g., a funnel of a crusher. The operator needs to make sure that he positions the grapple roughly in the designated spot before triggering the balancing controller manually. Subsequently, the control unit can calculate the respective counter movement based on the information received from sensor 511, which is an IMU in the shown embodiment.

Figure 3:
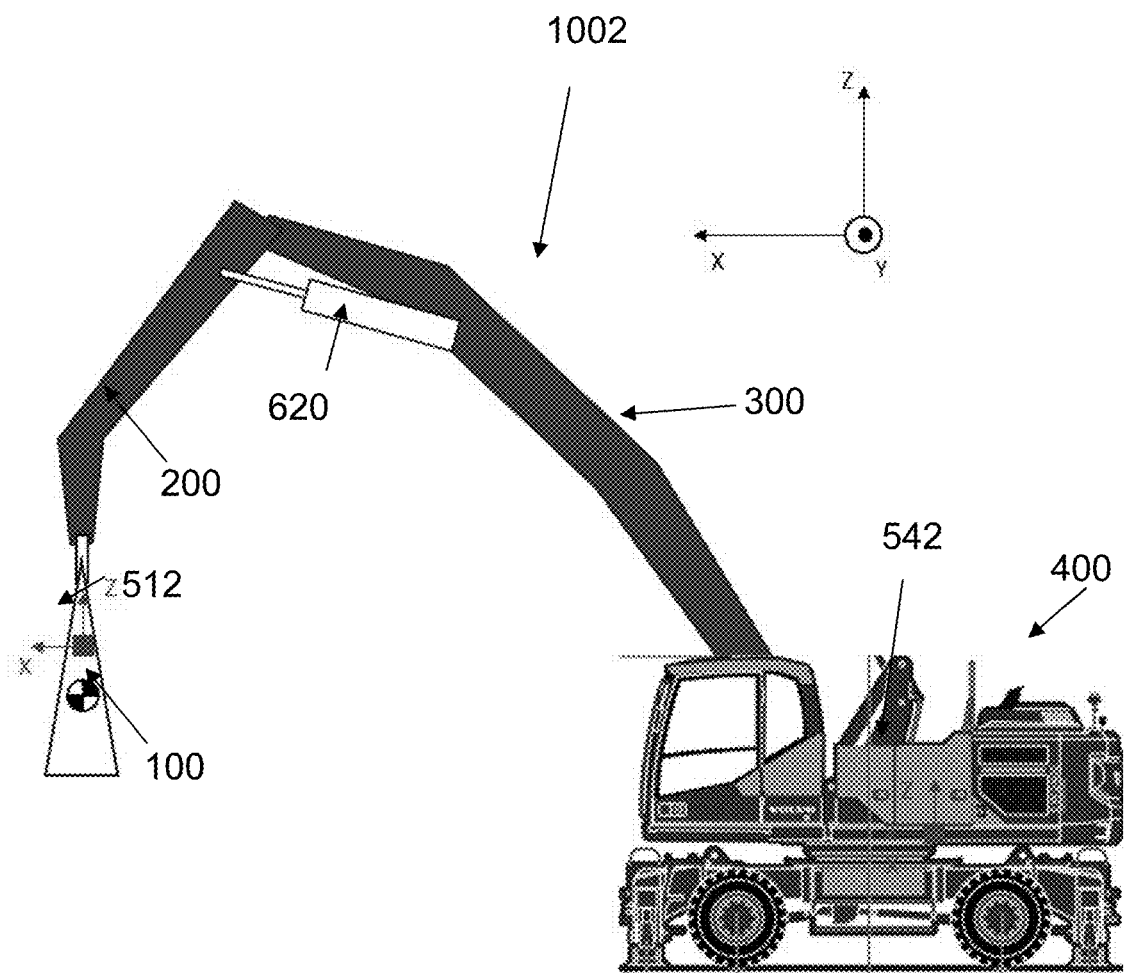
FIG. 3 is a schematic view of a material handler with an operator assist system according to a further embodiment.

FIG. 3 is a schematic view of a material handler with an operator assist system according to at least one embodiment. Compared to the material handler 1001 of FIG. 2 the operator assist system of the material handler 1002 has a further sensor additionally to the sensor 512 at the freely suspended tool, namely sensor 542 at the body of the working machine. Compared to the setup with just one sensor on the tool, multiple sensors, e.g., IMUs allow for more positions of the working machine where the operator assist system can be used easily. For example the shown configuration with one sensor 512 on tool 100 and one sensor 542 on the body an increased range of pitch and role angles is allowable for the position of the working machine compared to just one sensor on the tool. With the four sensors in the embodiment of FIG. 1 all position of the working machine can be used.

Figure 4:
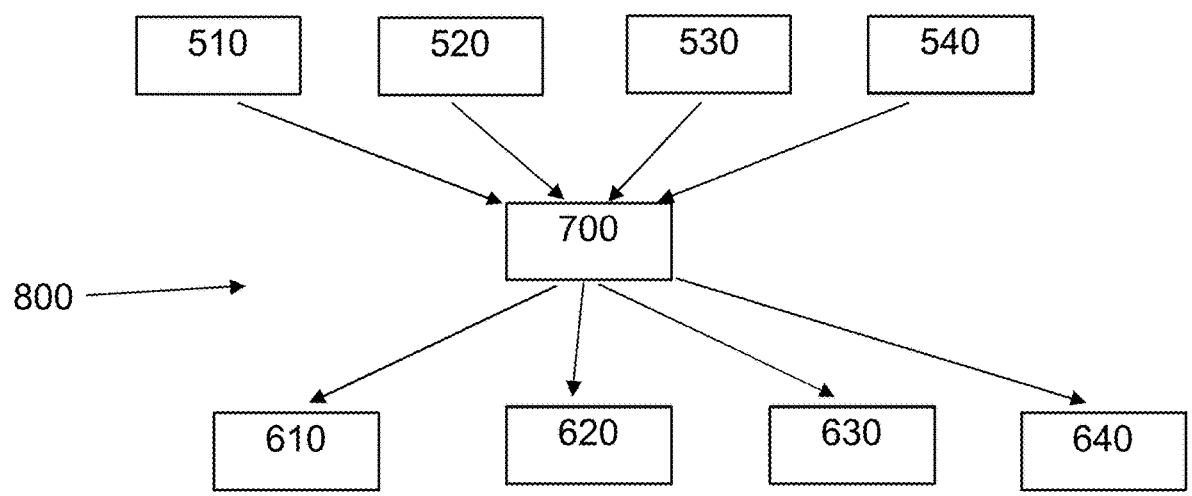
FIG. 4 is a functional representation of an operator assist system according to a further embodiment.

FIG. 4 is a functional representation of an operator assist system 800 according to at least one embodiment. The operator assist system 800 for a working machine having a boom and an arm and with a freely suspended tool comprises for sensors 510, 520, 530, 540. A first sensor 510 is arrangeable at the freely suspended tool 100, a second sensor 520 is arrangeable at the arm 300, a third sensor 530 is arrangeable at the boom 300 and a fourth sensor 540 is arrangeable at a machine body 400. All these sensors are able to measure angle, velocity and acceleration. The operator assist system 800 further comprises fast reacting drives, one fast reacting drive 610 for the boom, one fast reacting drive 620 for the arm 200 and swing drive 630. Furthermore the operator assist system comprises a control unit 700, which is able to calculate a needed counter or amplifier movement based on information on angle, velocity and/or acceleration received from the at least one sensor and control the fast reacting drives 610, 620, 630 to carry out the counter or amplifier movement accordingly or to initiate a deceleration of the working machine according to the calculated needed counter movement, if the working machine is moving along. Initiating a deceleration may comprise either to initiate a notification on the need of deceleration to the driver or to send a signal for deceleration to a machine control unit 640.

The control unit 700 may further be able to detect an oscillation of the freely suspended tool based on the information received from the sensors and to initiate calculation of the counter or amplifier movement and/or to initiate a notification on the oscillation to the driver. The control unit may further be able to continuously calculate the counter or amplifier movement.

The operator assist system 800 can further comprise a user interface, which is designed to initiate calculation of the counter or amplifier movement on actuation by the operator and/or to disable any counter or amplifier movement on actuation by the operator. In some embodiments, the user interface is at least one button and may be arranged in a joystick of the working machine. The control unit 700 is further able to isolate an oscillating motion of the freely suspended tool from its translatory movement due to a movement of the working machine using signal filtering and/or to isolate an oscillating motion of the freely suspended tool from its rotatory movement due to a movement of the working machine using signal filtering.

REFERENCE SIGNS 100 grapple or freely suspended tool
200 arm
300 boom
400 machine body
510 first sensor
511 sensor
512 sensor
520 second sensor
530 third sensor
540 fourth sensor
542 sensor
610 fast reacting drive
620 fast reacting drive
630 swing drive
640 machine control unit
700 control unit
800 operator assist system
1000 material handler 1001 material handler
1002 material handler

The invention claimed is:

1. An operator assist system for a working machine having a boom and an arm and with a freely suspended tool comprising:
    at least four sensors, wherein a first sensor is arranged at the freely suspended tool, a second sensor is arranged at the arm, a third sensor is arranged at the boom and a fourth sensor is arranged at a machine body and wherein the sensors are able to measure angle, velocity and/or acceleration;
    fast-reacting drives for boom and arm and as swing drive; and
    a control unit configured to
    calculate a needed counter or amplifier movement according to at least one of three orthogonal movement directions, based on information on angle, velocity and/or acceleration received from the at least one sensor, and
    control the fast-reacting drives to carry out the counter or amplifier movement accordingly or to initiate a deceleration or acceleration of the working machine according to the calculated needed counter movement if the working machine is moving along.

2. The operator assist system according to claim 1, wherein the fast-reacting drives are hydraulic, electric rotary and/or electric linear drives.

3. The operator assist system according to claim 1, wherein at least one sensor is an Inertial Measurement Unit, a stroke sensor or a Hall-Effect Angle sensor.

4. The operator assist system according to claim 1, wherein the velocity is an angular velocity and/or the acceleration is an angular acceleration.

5. The operator assist system according to claim 1, wherein the counter or amplifier movement comprises at least one of the following movement directions: moving the arm in or out, moving the boom up or down and swing left or right.

6. The operator assist system according to claim 1, wherein the control unit is further able to detect an oscillation of the freely suspended tool based on the information received from the sensors and to initiate calculation of the counter or amplifier movement and/or to initiate a notification on the oscillation to the driver.

7. The operator assist system according to claim 1, wherein the control unit is able to continuously calculate the counter or amplifier movement.

8. The operator assist system according to claim 1, further comprising a user interface, which is designed to initiate calculation of the counter or amplifier movement on actuation by the operator and/or to disable any counter or amplifier movement on actuation by the operator.

9. The operator assist system according to claim 8, wherein the user interface is at least one button.

10. The operator assist system according to claim 9, wherein the button is arranged in a joystick of the working machine.

11. The operator assist system according to claim 1, wherein the control unit is further able to isolate an oscillating motion of the freely suspended tool from its translatory movement due to a movement of the working machine using signal filtering and/or to isolate an oscillating motion of the freely suspended tool from its rotatory movement due to a movement of the working machine using signal filtering.

12. The operator assist system according to claim 1, wherein initiating a deceleration comprises either to initiate a notification on the need of deceleration to the driver or to send a signal for deceleration to a machine control unit.

13. Working machine having a boom, an arm and a freely suspended tool with an operator assist system according to claim 1.

14. A method for annihilation or amplifying oscillation of a freely suspended tool of a working machine having a boom and/or an arm and a fast-reacting swing drive, the method comprising:
    measuring angle, velocity and/or acceleration using at least four sensors, wherein a first sensor is arranged at the freely suspended tool, a second sensor is arranged at the arm, a third sensor is arranged at the boom and a fourth sensor is arranged at a machine body and wherein the sensors are able to measure angle, velocity and/or acceleration;
    calculating a needed counter or amplifier movement according to at least one of three orthogonal movement directions, based on measured angle, velocity and/or acceleration; and
    carrying out the counter or amplifier movement using fast reacting drives for boom and/or arm and/or the swing drive accordingly or initiate a deceleration of the working machine according to the calculated needed counter movement if the working machine is moving along.

15. The method according to claim 14, further comprising the step of isolating an oscillating motion of the freely suspended tool from its translatory movement due to a movement of the working machine using signal filtering.

16. The method according to claim 14, further comprising the step of isolating an oscillating motion of the freely suspended tool from its rotatory movement due to a movement of the working machine using signal filtering.

* * * * *